United States Patent [19]
Garrett et al.

[11] Patent Number: 5,294,055
[45] Date of Patent: Mar. 15, 1994

[54] ROTATABLE ARMS FOR THRUST VECTORING AND CHANGING THE AREA OF A NOZZLE THROAT

[75] Inventors: Timothy M. Garrett, Florissant; David E. Zilz, St. Peters, both of Mo.

[73] Assignee: McDonnell Douglas Corporation, Long Beach, Calif.

[21] Appl. No.: 941,919

[22] Filed: Sep. 8, 1992

[51] Int. Cl.$^5$ .............................................. B64C 15/02
[52] U.S. Cl. .................... 239/265.19; 244/52; 60/230
[58] Field of Search ............... 239/265.19, 265.35; 244/51, 52; 60/230

[56] References Cited

U.S. PATENT DOCUMENTS

| | | |
|---|---|---|
| 2,693,079 | 11/1954 | Rau . |
| 2,799,989 | 7/1957 | Kappus ........................... 239/265.35 |
| 2,943,821 | 7/1960 | Wetherbee, Jr. . |
| 3,096,049 | 7/1963 | Karasinski . |
| 3,693,880 | 9/1972 | Versaw et al. . |
| 3,743,184 | 7/1973 | Mancus . |
| 3,749,317 | 7/1973 | Osofsky . |
| 3,774,868 | 11/1973 | Goetz . |
| 3,907,222 | 9/1975 | McComas . |
| 3,970,253 | 7/1967 | Burkes et al. . |
| 4,050,631 | 9/1977 | Sytelbo . |
| 4,143,837 | 3/1979 | Thunholm . |
| 4,168,031 | 9/1979 | McCullough et al. . |
| 4,274,610 | 6/1981 | Bastian . |
| 4,627,586 | 12/1986 | Krumins et al. . |
| 4,641,782 | 2/1987 | Woodward ................. 239/265.35 X |
| 4,848,664 | 7/1989 | Thayer ....................... 239/265.35 X |
| 4,978,071 | 12/1990 | MacLean et al. .......... 239/265.35 X |
| 4,993,638 | 2/1991 | Lardeuier .................. 239/265.19 X |
| 5,082,181 | 1/1992 | Brees et al. ..................... 239/265.35 |
| 5,092,524 | 3/1992 | Garrett et al. ................... 239/265.19 |
| 5,110,047 | 5/1992 | Toews ............................ 239/265.35 |
| 5,154,050 | 10/1992 | Herup et al. ........................ 60/230 |

OTHER PUBLICATIONS von Glahn and Povolny, "Jet Deflection Devices...", SAE Journal, Jan., 1958, pp. 64–65.

*Primary Examiner*—Andres Kashnikow
*Assistant Examiner*—William Grant
*Attorney, Agent, or Firm*—John P. Scholl; James M. Skorich

[57] ABSTRACT

Two arms rotatably mounted in slideable abutment with an interior wall of a nozzle. The arms extend from a common axis of rotation, and each includes a bump having a crest running radially from the axis of rotation to the tip of the arm. Together with the opposing ceiling and adjacent sidewalls of the nozzle, the arms define the moveable throat of the nozzle. The ceiling of the nozzle opposite the arms is contoured so that rotation of the arms changes the area of the nozzle throat while changing the direction of fluid medium flowing through the nozzle. The arms are connected by a linkage which coordinates their movement. Coordinated rotation of the arms can simultaneously change the throat area of the nozzle and the direction of fluid flow, or change either the throat area or the direction of fluid flow while keeping the other constant.

19 Claims, 7 Drawing Sheets

ROTATABLE ARMS FOR THRUST VECTORING AND CHANGING THE AREA OF A NOZZLE THROAT

BACKGROUND OF THE INVENTION

1. Field of the Invention

This invention relates to vectoring thrust and changing the throat area of a ducted propulsion system. More particularly, the invention comprises two arms rotatably mounted along an interior wall of a choked flow nozzle which, when rotated, vector engine thrust and vary the throat area of the propulsion system.

2. Description of the Prior Art

Unless its trajectory is ballistic, a flight vehicle must have means for changing its direction of travel and, in particular, its rotation about the yaw axis. When a flight vehicle is powered by a jet engine, the performance characteristics of the jet engine are of prime importance. These two fundamental tenets play significant roles in the design and performance of every flight vehicle powered by a jet engine.

The performance of a jet engine is directly affected by the throat area of the exhaust nozzle. Performance is maximized when the area of the choke plane of the engine's exhaust nozzle approximates the theoretical optimal value that can be calculated using equations well known in the art of fluid mechanics. Simply stated, the optimal choke plane area will vary as a function of the altitude, Mach number and power setting at which the jet engine is operating. Since these parameters vary throughout a typical flight, it is not possible for a jet engine to be operating at maximum efficiency throughout the entire flight envelope of a flight vehicle unless the throat area can be varied.

One means to enhance jet engine efficiency is to change the throat area by means of a rotatable conical plug located in the nozzle throat. An example of such a device is shown in U.S. Pat. No. 3,907,222 issued to Tommy D. McComas. This approach reduces the thrust otherwise generated because the plug obstructs the fluid medium flowing through the nozzle.

Rotation about the yaw, pitch or roll axis is commonly controlled by having a control surface projecting from the fuselage and exposed to the ambient wind. The control surface is deflected to create the desired moment about the vehicle's center of gravity. This invention is directed to controlling yaw. However, as will subsequently become clear, the invention could alternatively be used to control pitch if its axis of rotation were rotated by 90° from the orientation shown in the described embodiment.

Yaw has typically been controlled by a vertical stabilizer having a hinged rudder, where the rudder comprises the aft section of the stabilizer. The stabilizer and rudder project radially outward from the external skin of the flight vehicle. Use of this apparatus causes an increase in the skin friction drag and pressure drag for the vehicle compared to what the magnitude of these drag components would be if the vehicle had no such projecting structure, with the drag increasing in proportion to the amount of deflection.

The surface area of the rudder must be adequate to provide sufficient force to control yaw at the minimum flight velocity of the vehicle. However, this area is more than enough to control the vehicle at higher velocities, and thus results in excessive drag at velocity greater than the minimum flight velocity. The rudder must also have sufficient area to provide the vehicle with the desired degree of maneuverability. Again, designing the rudder to have the capability of providing the desired degree of maneuverability penalizes the vehicle with drag when the capability to maneuver is not being fully utilized.

The advent of the jet engine has been accompanied by numerous efforts to implement directional control by vectoring the thrust loads produced by such an engine. The common approach is to place a hinged rudder or rotatable vane in the expansion shroud downstream of the throat. This provides a smoother aerodynamic shape for the external skin. However, the rudder or rotatable vane is located in the supersonic exhaust flow downstream of the sonic choke plane. This placement creates shock waves which reduce the thrust and the resultant control force which would otherwise be generated by a given deflection of the rudder or vane.

The drawbacks caused by the shock waves created by a rotatable vane in the nozzle can be avoided by placing the vane in the throat, as shown in U.S. Pat. No. 3,743,184 issued to H. Vincent Mancus. However, positioning a rotatable vane in the nozzle throat causes variation of the effective throat area and results in fluctuations of the static pressure whenever the vane is rotated to vector thrust. More particularly, suddenly reducing the throat area in the nozzle of a jet engine will cause a rapid increase in the static pressure upstream of the throat. If such a device is used with an air breathing turbine propulsion system, the sudden increase in static pressure downstream of the turbine machinery can stall airflow across the turbine blades and cause an instantaneous degradation of engine performance.

Conversely, if the effective throat area is rapidly increased by the thrust vectoring mechanism, the static pressure will quickly drop and reduce the turbine efficiency, with a resultant degradation of engine performance. In summary, the use of a rotatable vane in the throat of the exhaust nozzle of an air breathing jet engine to vector its thrust will cause the performance of the engine to wander. Depending on the rates at which the vane is rotated, these performance variations may be uncontrollable.

Thrust vectoring is also achieved by complex mechanical devices which swivel the exhaust shroud of the nozzle so that the flow is deflected to exhaust in the desired direction. Such apparatus cause an increase in drag. They also are very complex and relatively heavy.

Several devices perform the dual functions of thrust vectoring and varying the area of the nozzle throat by deflecting the fluid flow with a vane or flap located in the nozzle, and concurrently changing the throat area by moving an obstruction located in the throat to change its projected planar area. Examples of such devices are shown in U.S. Pat. No. 3,970,253 issued to William M. Burkes and William H. Miller, and U.S. Pat. No. 3,774,868 issued to Gerald F. Goetz. These devices are combinations of prior art apparatus which are used independently to achieve the two functions, and thus suffer the aforementioned thrust and weight penalties attendant to the use of such apparatus.

The applicants have also invented the thrust vectoring device disclosed in U.S. Pat. No. 5,092,524 entitled Nozzle Throat Disc for Thrust Vectoring. The apparatus described therein is a symmetrical disc located in the throat of a nozzle. The disc is rotatable about an axis which passes through its center and lies normal to the upstream fluid flow. A rounded bump runs radially along a disc diameter and projects from both major surfaces. When the disc is rotated so that the diametrical bump is not perpendicular to the upstream fluid flow, the fluid flow turns upon passing over the bump to flow in a direction approximately normal to the bump. This device overcomes the aforementioned problems and drawbacks attendant to prior art devices for vectoring thrust, but does not solve the problem of changing the throat area in order to maximize engine performance at various altitudes and fluid velocities.

SUMMARY OF THE INVENTION

Briefly, the present invention is comprised of two arms rotatably mounted in slideable abutment with an interior wall in the exhaust nozzle of a jet engine. The arms rotate separately from each other about a common axis of rotation. Each arm includes a bump having a crest running radially from the axis of rotation to the tip of the arm. The two arms together with the opposing ceiling and adjacent sidewalls of the nozzle form the throat of the nozzle. The rotation of the arms is coordinated by a connecting linkage. The nozzle ceiling opposing the arms is shaped so that the nozzle throat occurs wherever the arms are positioned, and thus the nozzle throat moves with the arms.

Both arms have a neutral position at which they are collinear and lie normal to the upstream fluid flow. When either arm is rotated to a position downstream of its neutral position, the opposing ceiling of the nozzle is shaped so that the area of that half of the throat increases. Conversely, when either arm is rotated to a position upstream of its neutral position, the ceiling is shaped so that the area of that half of the throat decreases. The total throat area is varied by coordinating the rotation of the two arms. As the fluid flow will turn upon crossing an arm to remain normal to the choke plane formed at the arm, thrust vectoring can also simultaneously be obtained by rotating one or both of the arms from their neutral positions.

Thrust vectoring without a change in the total throat area can be obtained by rotating one arm upstream through an angle of rotation, and the other arm downstream through the same angle of rotation. The total throat area can be changed without thrust vectoring by rotating both arms either upstream or downstream through the same angle of rotation.

The invention vectors thrust without deflecting or otherwise obstructing supersonic flow, and thus avoids the thrust penalty and increased drag attendant to devices which accomplish thrust vectoring by deflecting the supersonic flow downstream of the sonic choke plane. Further, the effective area of the nozzle throat is known and controlled for all angles of thrust deflection, and thus the performance of an air breathing jet engine is not adversely and unpredictably affected by rapid and random changes in the static pressure upstream of the throat. In particular, the invention can vector thrust without changing the area of the nozzle, thus preventing rapid fluctuations in the static pressure upstream of the nozzle throat which would degrade jet engine performance and cause uncontrolled wandering of the engine speed.

The invention does not entail the mechanical complexity and weight of apparatus which vector thrust by moving the walls of the exhaust nozzle. Further, a flight vehicle can be rotated about its yaw axis without requiring a rudder or other moving structure external to its fuselage skin, and thus the invention will not increase the skin friction and pressure drag of the flight vehicle.

Modern fly-by-wire flight control systems, used in conjunction with the thrust vectoring of the invention, can compensate for the loss of the passive directional stability otherwise provided by the vertical stabilizer. The invention thus allows the designer to take full advantage of modern flight control technology and translate it into decreased drag and weight, thereby enhancing the performance of a flight vehicle without sacrificing maneuverability or stability.

In addition, the invention varies the throat area of the nozzle without requiring the complex and heavy mechanical apparatus necessary to move the walls of the nozzle. Further, the invention allows the throat area to be continuously changed to optimally suit the altitude and engine thrust, as opposed to the limited number of discrete throat areas that can be obtained with the rotatable asymmetrical plugs of the prior art.

The invention performs the dual functions of thrust vectoring and changing the nozzle throat area with a single apparatus of relatively simple mechanical structure. It thus obtains the advantages of weight, space and reliability over combining two devices of the prior art, or using any of the devices of the prior art which perform both functions but are demonstrably more complex and heavy, and also require more space.

DESCRIPTION OF AN EMBODIMENT OF THE PRESENT INVENTION

Figure 1:
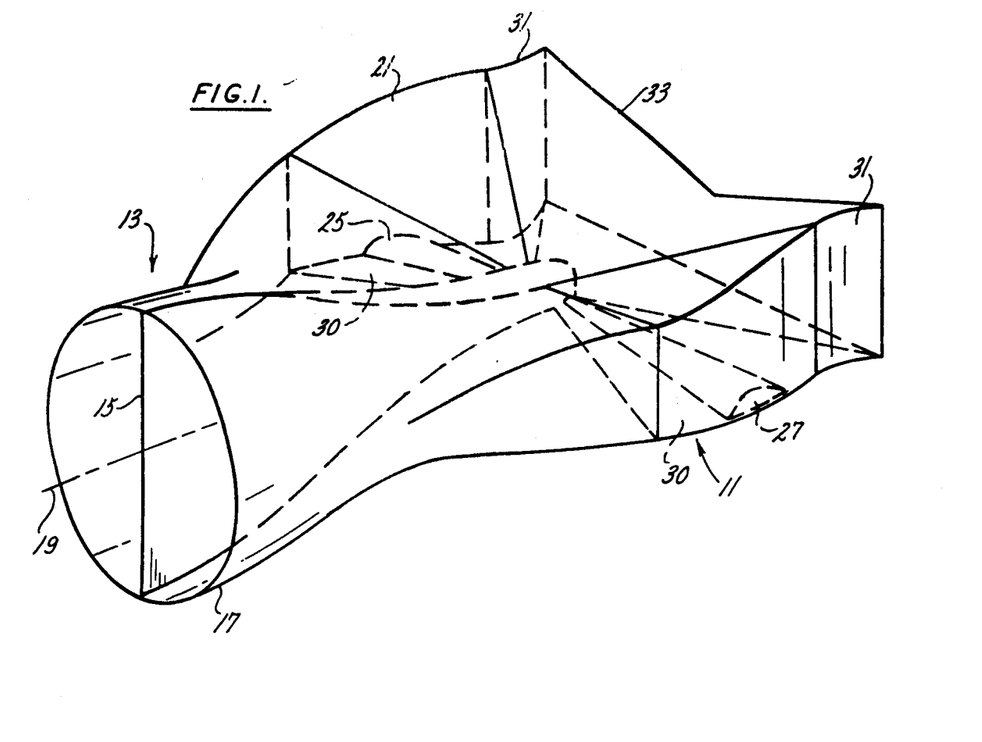
FIG. 1 is a perspective view of an exhaust nozzle containing the rotatable arms of the present invention.
Figure 2:
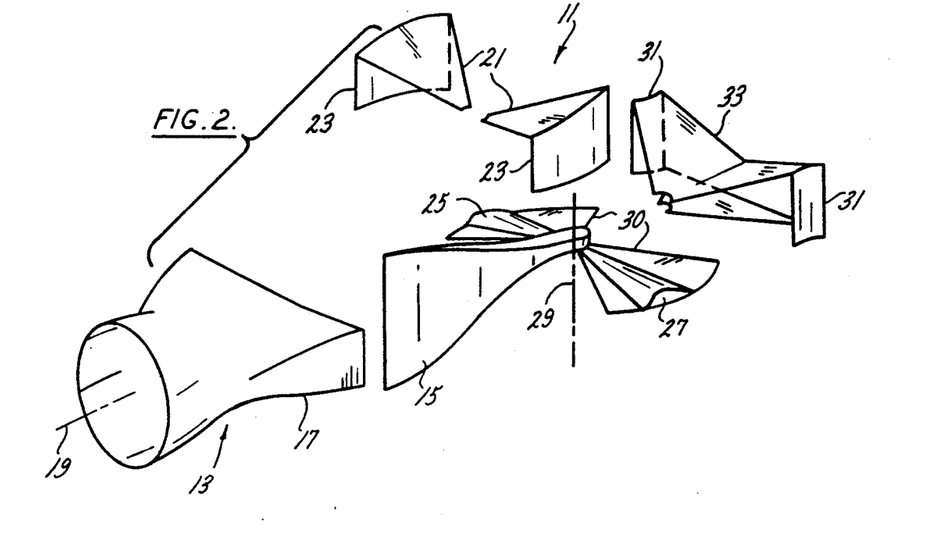
FIG. 2 is an explosion drawing of the apparatus shown in FIG. 1.

Turning to the drawings, FIG. 1 is a perspective view of apparatus 11, an embodiment of the invention, installed in exhaust nozzle 13 of a ducted propulsion system. FIG. 2 is an explosion drawing of the parts shown assembled in FIG. 1.

More particularly, bifurcation wall 15 is located in transition duct 17 of nozzle 13, and lies along centerline 19 of transition duct 17. Ceiling 21 and sidewalls 23 lie downstream of transition duct 17 and are attached thereto. Arms 25 and 27 rotate about axis 29, which is normal to centerline 19. In their full range of motion, arms 25 and 27 slide over a section of the nozzle floor designated as floor 30. Floor 30 is a surface of revolution. A seal is maintained between each arm and floor 30.

Each arm includes a bump which runs radially along its entire length to its tip. The maximum thickness of the bump remains constant and forms a crest. Expansion shroud 31 is located downstream of arms 25 and 27. Exhaust opening 33 is an opening in expansion shroud 31 which allows the fluid passing through nozzle 13 to fluidly communicate with the ambient atmosphere.

Figure 3A:
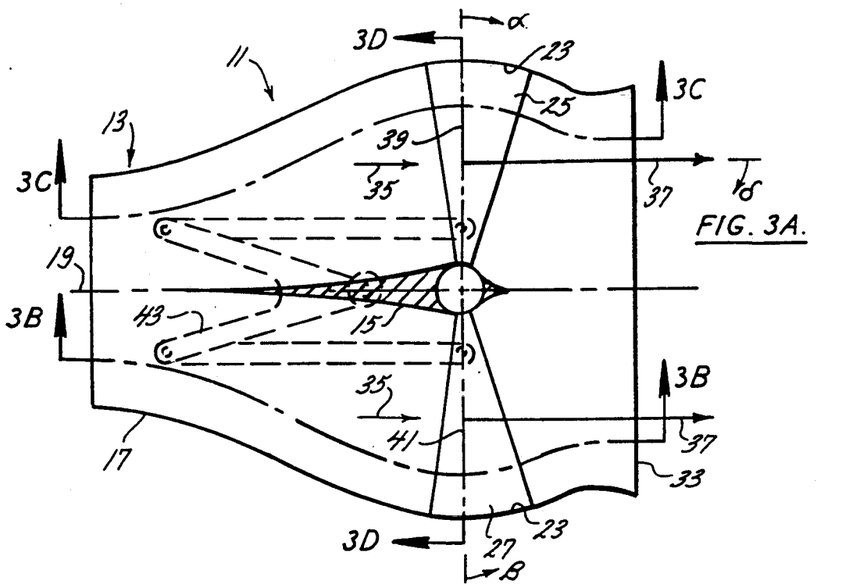
FIGS. 3A, 4A, 5A and 6A are plan views of the rotatable arms in four different angular positions. Next to each plan view and designated as FIGS. 3B, 4B, 5B and 6B, respectively, is a sectional view taken along line B—B of the plan view which shows the contour of the ceiling of the exhaust nozzle and the longitudinal position of one of the arms. Also shown are FIGS. 3C, 4C, 5C and 6C, which are sectional views respectively taken along line C—C of each plan view, showing the contour of the ceiling of the exhaust nozzle together with the longitudinal position of the remaining arm.

FIG. 3A is a plan view of apparatus 11 in exhaust nozzle 13, with apparatus 11 positioned in its neutral configuration. Arms 25 and 27 are situated collinearly and normal to bifurcation wall 15. The respective angles of rotation for arms 25 and 27, $\alpha$ and $\beta$, are both 0°. For future reference, both $\alpha$ and $\beta$ are positive for the downstream rotation of arms 25 and 27, respectively, relative to their neutral positions; and negative for their rotation upstream relative to their neutral positions. The foregoing sign convention is shown in FIG. 3A.

With arms 25 and 27 at a rotation angle of 0°, their neutral configuration, apparatus 11 will not cause deflection of the flow of fluid. That is, the deflection angle $\delta$ between fluid streamlines 35 upstream of the arms and fluid streamlines 37 downstream of the arms is 0°. For future reference, $\delta$ is positive for a deflection of fluid streamlines 37 towards centerline 19, and negative for a deflection of fluid streamlines 37 away from centerline 19. The foregoing sign convention is also shown in FIG. 3A.

Figure 3B:
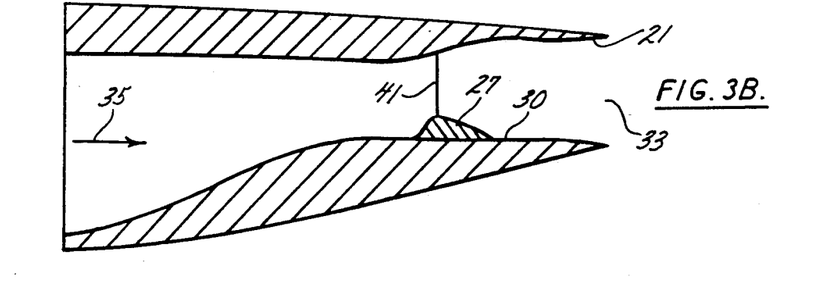
Figure 3C:
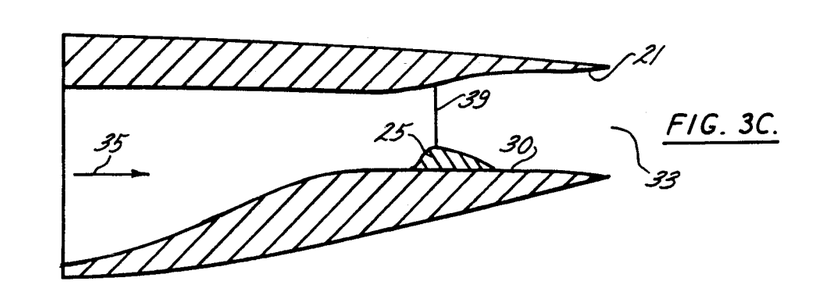

Cross sections taken along lines 3B—3B and 3C—3C of FIG. 3A are shown in FIGS. 3B and 3C, respectively. The foregoing figures provide cross sections of arms 27 and 25, respectively, and thus show a cross section of the radial bump of each arm. The contour of ceiling 21 is also shown.

Figure 3D:
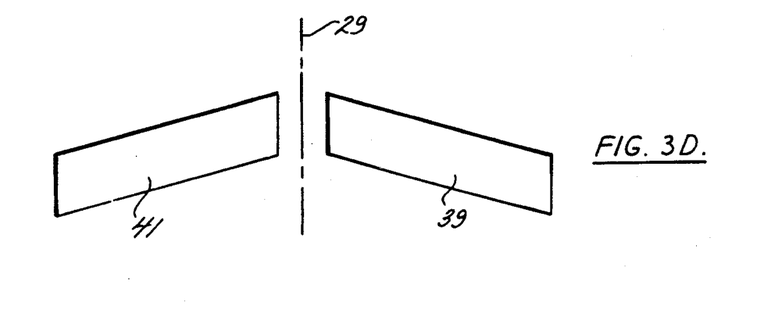
FIGS. 3D, 4D, 5D and 6D are sectional views respectively taken along line D—D of each plan view, showing the planar area for both halves of the throat section for the illustrated position of the arms.

The throat of a nozzle is the planar cross section having the minimum area. Due to bifurcation wall 15, the throat in nozzle 13 will have two half-sections, throat section 39 and throat section 41. Throat section 39 is formed by arm 25 together with bifurcation wall 15, ceiling 21 and sidewall 23, and is shown as a line in FIG. 3C. Throat section 41 is formed by arm 27 together with bifurcation wall 15, ceiling 21 and sidewall 23, and is shown as a line in FIG. 3B. FIG. 3D is a cross section of FIG. 3A taken along line D—D, and shows the planar area of throat sections 39 and 41. Given sufficient upstream flow velocity, sonic choke planes will be formed at throat sections 39 and 41.

Figure 4A:
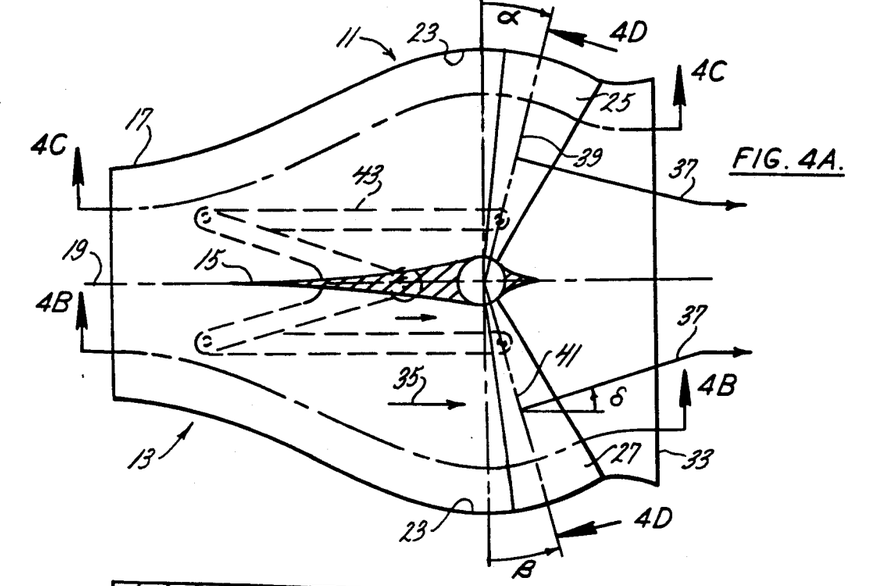
Figure 5A:
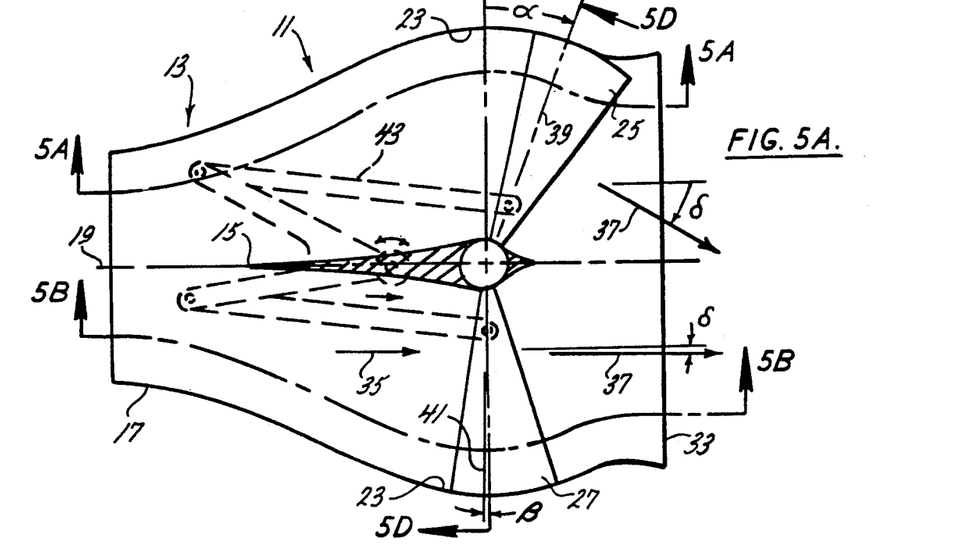
Figure 6A:
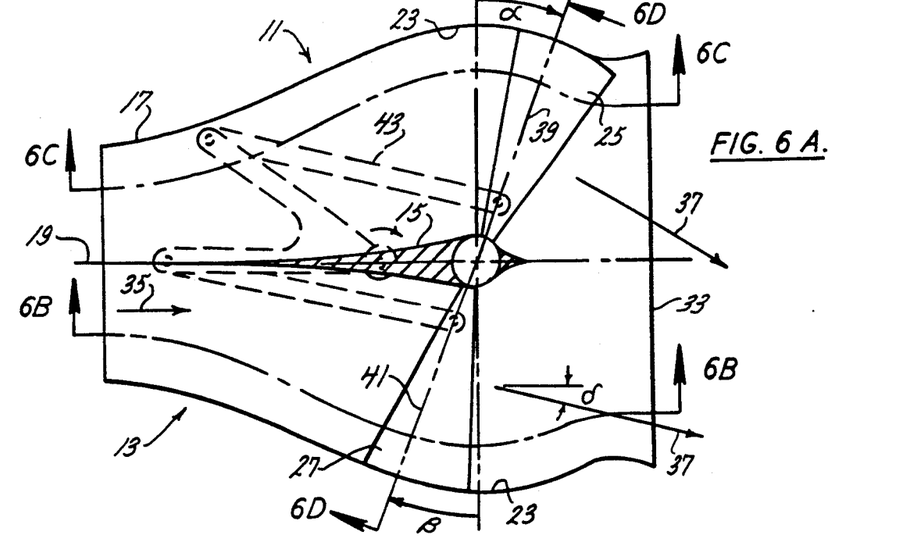

FIGS. 4A, 5A and 6A, together with their associated cross-sectional figures, show three different angular configurations of arms 25 and 27 in addition to the neutral configuration shown in FIG. 3A. Also shown in the foregoing figures is linkage 43, which is rotatably connected to arms 25 and 27. Linkage 43 coordinates the rotation of the two arms to position them in various configurations. Linkage 43 is a singular example of a type of linkage device well known to those versed in the mechanical art, and any one of this type of linkage device may be substituted for linkage 43 to the same effect.

Figure 7:
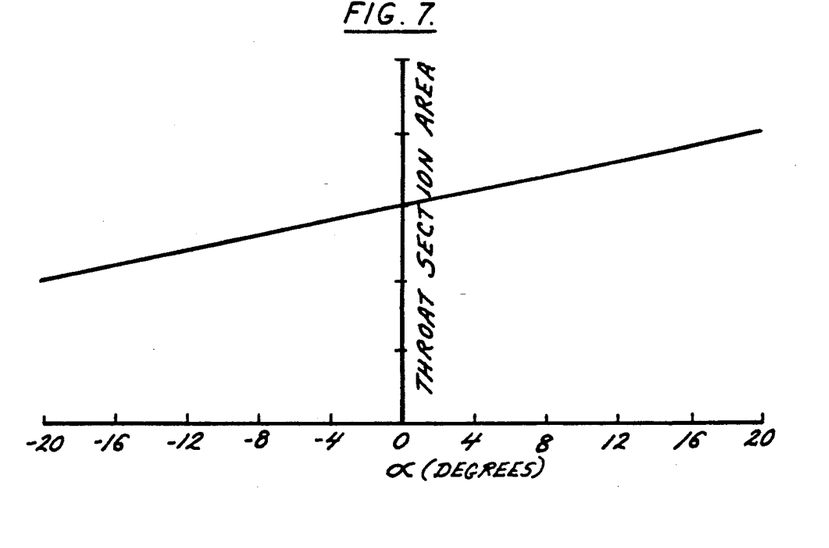
FIG. 7 is a graph showing the variance in the area of a throat section as a function of the rotation angle of an arm.

The locations of throat sections 39 and 41 will move with the rotation of arms 25 and 27. Since ceiling 21 is contoured, the respective areas of throat sections 39 and 41, and thus the sum total of the area of the throat of nozzle 13, will vary with the rotation of arms 25 and 27. FIG. 7 is a graph showing the variance in area of throat section 39 as a function of the rotation angle $\alpha$ of arm 25. The relationship is the same between the area of throat section 41 and the rotation angle $\beta$ of arm 27.

In addition to changing the area of the throat, the rotation of arms 25 and 27 can also change the direction of the fluid flow emanating from exhaust opening 33 of exhaust nozzle 13. Fluid flow streamlines 35 upstream of arms 25 and 27 are subsonic. As the flow approaches the crest of arms 25 and 27, the cross-sectional area of exhaust nozzle 13 decreases and the velocity of the fluid flow increases until it becomes sonic at the choke plane formed at throat sections 39 and 41. After passing through throat sections 39 and 41, the compressed fluid expands and accelerates as streamlines 37 in a direction nearly normal to the arm over which it passed because the pressure in the normal direction will be the lowest for every streamline. Thus, if an arm is not perpendicular with respect to upstream streamlines 35, downstream streamlines 37 will turn towards normality with the arm.

Figure 8:
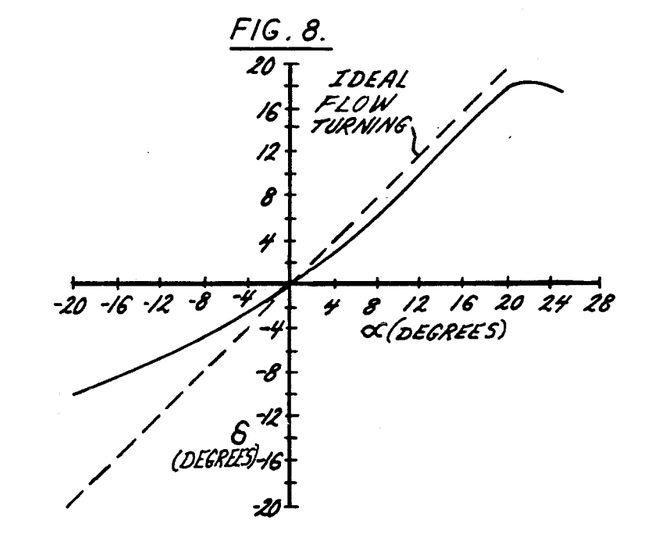
FIG. 8 is a graph comparing the maximum flow deflection obtainable for an arm of the present invention with the flow deflection predicted from experimental tests and mathematical analysis.

The maximum flow turning theoretically obtainable by an arm of the present invention would be a deflection angle $\delta$ equal to the arm's rotation angle. This is shown in FIG. 8, a graph having the angle of deflection $\delta$ as the ordinate and the angle of rotation $\alpha$ of arm 25 as the absicissa. The straight line labeled "ideal flow turning" represents the theoretical maximum flow deflection obtainable by rotating arm 25. The adjacent curved line shows the deflection angle $\delta$ predicted for arm 25 for positive values of $\alpha$, derived from experimental data.

The graph illustrates that as $\alpha$ is increased in a positive direction so that arm 25 is rotated downstream, the effectiveness of arm 25 in turning the flow gradually diverges from the theoretical maximum but maintains a reasonably close correlation until $\alpha$ exceeds approximately 20°. Above this angle, the divergence accelerates substantially such that further rotation is of little effect.

As $\alpha$ is increased in a positive direction and arm 25 is rotated downstream, the flow is turned so that it is directed away from sidewalls 23 and is thus unobstructed. This is in contrast to $\alpha$ being increased in a negative direction so that arm 25 is rotated upstream. In the latter situation, the deflection angle $\delta$ is negative and the flow is turned into sidewalls 23 and obstructed. This diminishes the turning effect of arm 25.

The effect of flow obstruction by sidewalls 23 is shown by the negative values of $\alpha$ in FIG. 8. The graph for these values was obtained using fluid flow equations well known to those knowledgeable in the discipline of fluid mechanics. The divergence of the angle of flow deflection $\delta$ from the theoretical maximum is greater than that for unobstructed flow. At $\alpha = -20°$, the predicted deflection angle $\delta$ is $-10°$, which is one-half of the theoretical maximum.

When one arm is rotated upstream and the other downstream, the downstream arm will have a mass flow rate through its throat greater than the mass flow rate through the throat of the upstream arm. This is so because, as illustrated by the graph of FIG. 7, the area of the throat section increases with downstream rotation and decreases with upstream rotation. It follows that the overall deflection of the flow caused by apparatus 11 will be weighted towards the deflection produced by the downstream arm.

Figure 9:
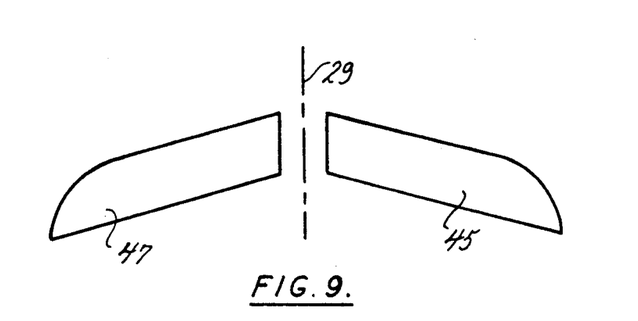
FIG. 9 is a cross section of the throat where the arms are in the neutral, nondeflecting position, for an embodiment of the present invention having a ceiling which laterally tapers downward towards the floor.

The obstructing effect of sidewall 23 reflects the trapezoidal shape of throat sections 39 and 41. This effect could be reduced by changing the shape of the throat sections so that the mass flow near sidewalls 23 is decreased. For example, this could be accomplished by changing the lateral line of ceiling 21 so that it is not straight, but tapered downwards. FIG. 9 illustrates throat sections 45 and 47, respectively formed by arms 25 and 27, for such an alternative embodiment of the present invention.

Figure 4B:
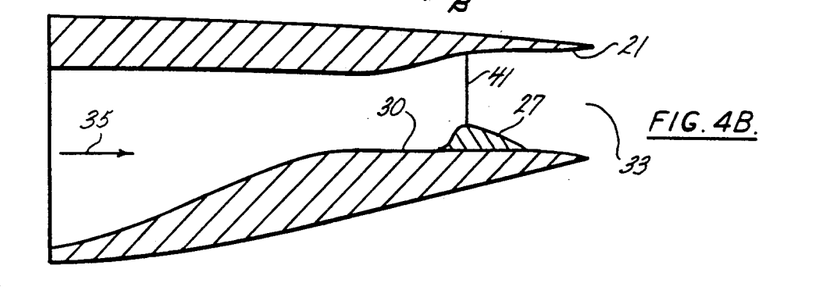
Figure 4C:
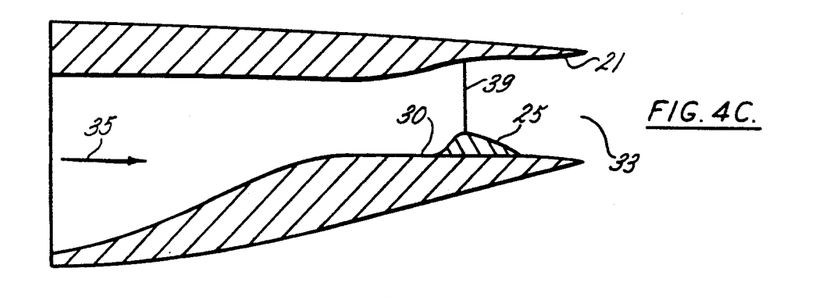

FIG. 4A shows arm 25 rotated downstream (clockwise) to an angle α of 15° and arm 27 rotated downstream (counterclockwise) to an angle β of 15°. Linkage 43 has been translated aft in order to obtain the foregoing configuration. As shown in FIGS. 4B and 4C, the contour of ceiling 21 flares away from floor 30 as one travels along ceiling 21 in the downstream or aft direction towards exhaust opening 33. As indicated by FIG. 7, this results in an increase of 25 percent in the areas of throat sections 39 and 41 and, concomitantly, the same percentage increase in the total throat area, relative to the two throat section areas and total throat area for arms 25 and 27 in their neutral positions.

Figure 4D:
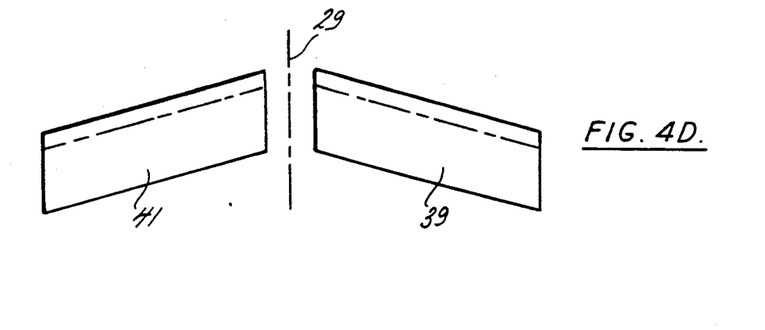

The aforementioned 25 percent increase in throat section areas is illustrated in FIG. 4D, a cross section taken along line 4D—4D of FIG. 4A. Shown therein in solid lines are the areas of throat sections 39 and 41 for the position of arms 25 and 27 shown in FIG. 4A. The dashed lines represent the location of ceiling 21 for arms 25 and 27 in their neutral configuration shown in FIG. 3A, and thus show, for purposes of comparison, the areas of throat sections 39 and 41 for the neutral configuration.

FIG. 8 indicates that the rotation of arms 25 and 27 to respective rotation angles α and 62 of 15° should cause streamlines 37 downstream of both arms to deflect by the same angle δ of approximately 13° towards centerline 19. Thus the direction of the thrust vector will not be changed from its neutral orientation collinear with centerline 19, and the sole effect of this configuration will be to increase the total area of the nozzle throat by 25 percent.

Experiments using adjacent nozzles having intersecting centerlines indicate that converging flow streamlines such as streamlines 37 will merge to form resultant streamlines having a direction in between the directions of the two originally converging streamlines, and that loss of thrust from the original converging streamlines having opposing thrust vector components is less than one percent where the incipient angle between the converging streamlines is no more than 60°. As the incipient angle of convergence between streamlines 37 immediately downstream of arms 25 and 27 should be approximately 26°, it is expected that thrust loss occasioned by having opposing thrust vector components will be negligible.

FIG. 5A shows a configuration in which arm 25 has been rotated through an angle α of 20° and arm 27 has been rotated through an angle β of −1°. Linkage 43 has been rotated in a clockwise direction and translated aft in order to obtain the aforementioned angular changes in the arms. FIG. 8 indicates that arm 25 should cause a deflection angle δ of 18°, and that arm 27 should cause a deflection angle δ of −1°.

Figure 5B:
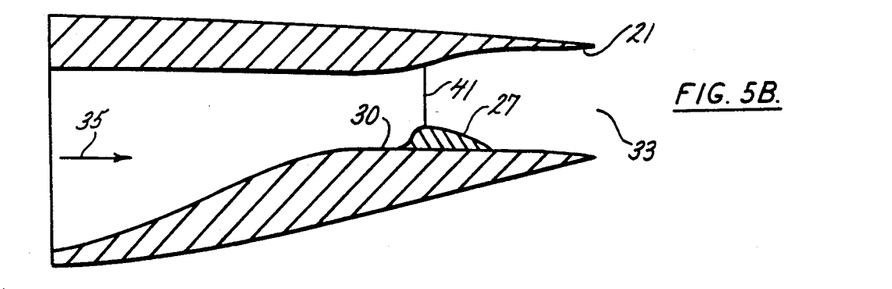
Figure 5C:
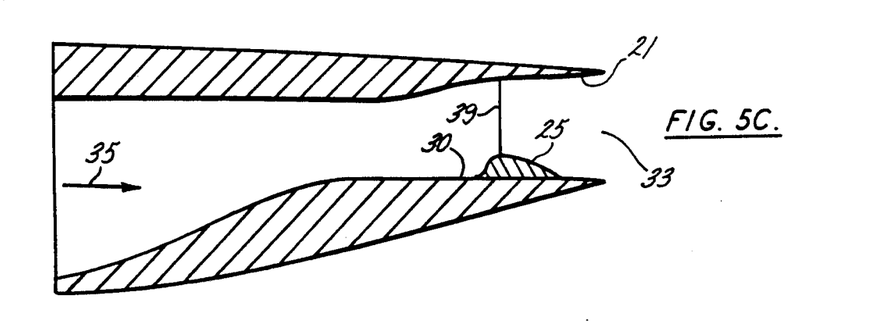

As shown in FIG. 5B, a cross section taken along line 5B—5B of FIG. 5A, arm 27 is rotated to a position upstream of its neutral position, the direction in which ceiling 21 necks inward towards floor 30. Rotation in this direction decreases the area of throat section 41 compared to its value for the neutral configuration. FIG. 5C is a cross section taken along line 5C—5C of FIG. 5A. It shows that the clockwise rotation of arm 25 causes throat section 39 to move in the direction in which ceiling 21 is flaring outwards, away from floor 30.

Figure 5D:
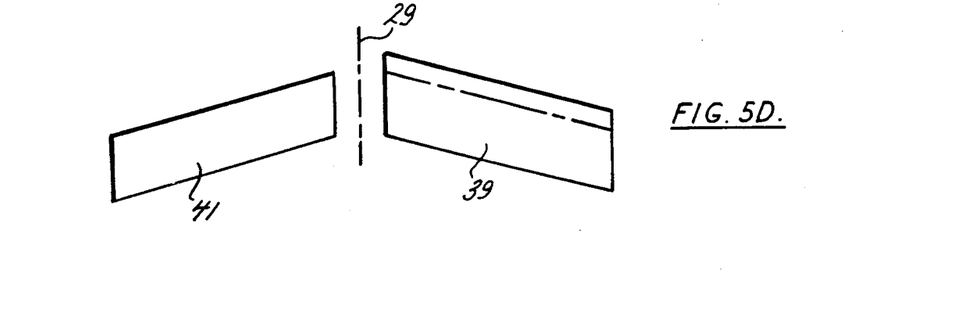

FIG. 5D is a cross section taken along line D—D of FIG. 5A. It shows, in solid lines, throat sections 39 and 41 for the configuration illustrated in FIG. 5A. The dashed line in throat section 39 represents the location of ceiling 21 for the neutral configuration of FIG. 3A, and thus depicts, for purposes of comparison, throat section 39 for arm 25 in its neutral position. FIG. 5D illustrates that, as indicated by FIG. 7, the configuration of FIG. 5A results in an increase of 33 percent in the area of throat section 39. A dashed line is not shown for throat section 41 because the clockwise rotation of arm 27 is so slight that the area of throat section 41 decreases negligibly from its value for the neutral position of arm 27.

The greater area of throat section 39 compared to that of throat section 41 will result in throat section 39 having a higher rate of mass flow than the rate of mass flow through throat section 41. The influence of arm 25 will thus be greater than that of arm 27. The thrust vector resulting from the configuration of arms 25 and 27 shown in FIG. 5A therefore will not be deflected by the simple average of the respective deflections caused by arms 25 and 27, that is, 9.5° in a clockwise direction, but rather by approximately 10.7° in a clockwise direction.

FIG. 6A shows a configuration in which arm 25 has been rotated through an angle α of 20° and arm 27 has been rotated through an angle β of −20°. Linkage 43 has been rotated in a clockwise direction to obtain the foregoing configuration of the arms. FIG. 8 indicates that arm 25 should cause a deflection angle δ of 18°, and that arm 27 should cause a deflection angle δ of −10°.

Figure 6B:
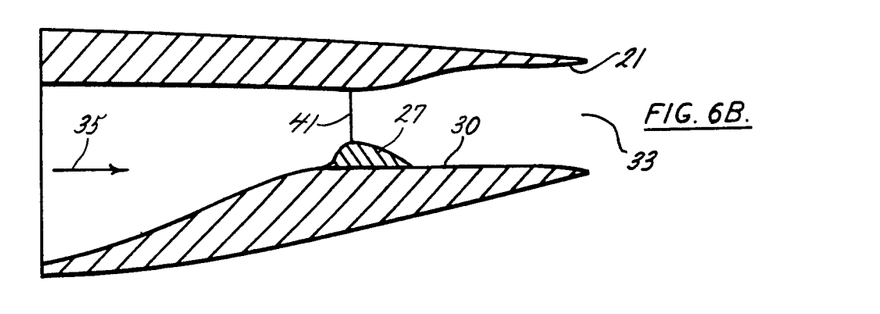
Figure 6C:
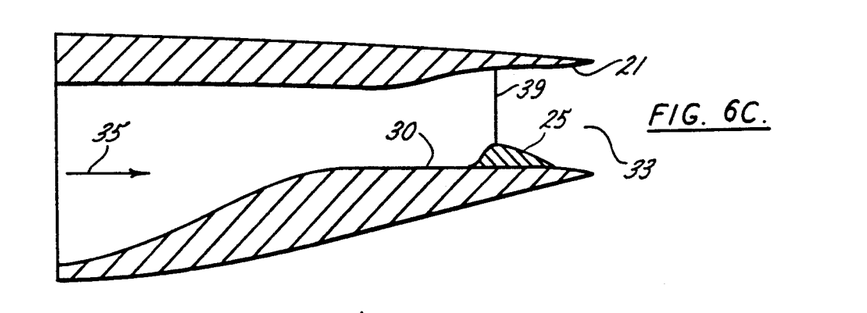
Figure 6D:
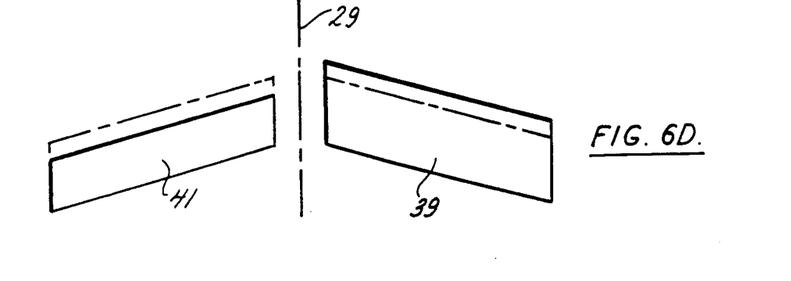

As shown by FIG. 6C, the clockwise rotation of arm 25 causes it to move in the direction in which ceiling 21 flares outwards. As indicated in FIG. 7 and illustrated in FIG. 6D, this results in an increase of 33 percent in the area of throat section 39 over its area for the neutral configuration. As illustrated in FIG. 6B, arm 27 has been moved in an upstream or forward direction, the direction in which ceiling 21 slopes towards centerline 19. As indicated by FIG. 7 and shown in FIG. 6D, this results in a decrease of 33 percent in the area of throat section 41.

The overall effect of this configuration is to keep the throat area constant. However, the greater relative area of throat section 39 will result in its having a higher rate of mass flow than the rate of mass flow through throat section 41. The thrust vector resulting from the respective flow deflections caused by arms 25 and 27 will thus be weighted towards the deflection caused by arm 25. It follows that the resultant thrust vector will not be deflected by the simple average of the respective deflections caused by arms 25 and 27, that is, 14° in a clockwise direction, but rather by approximately 15.3° in a clockwise direction.

Figure 10:
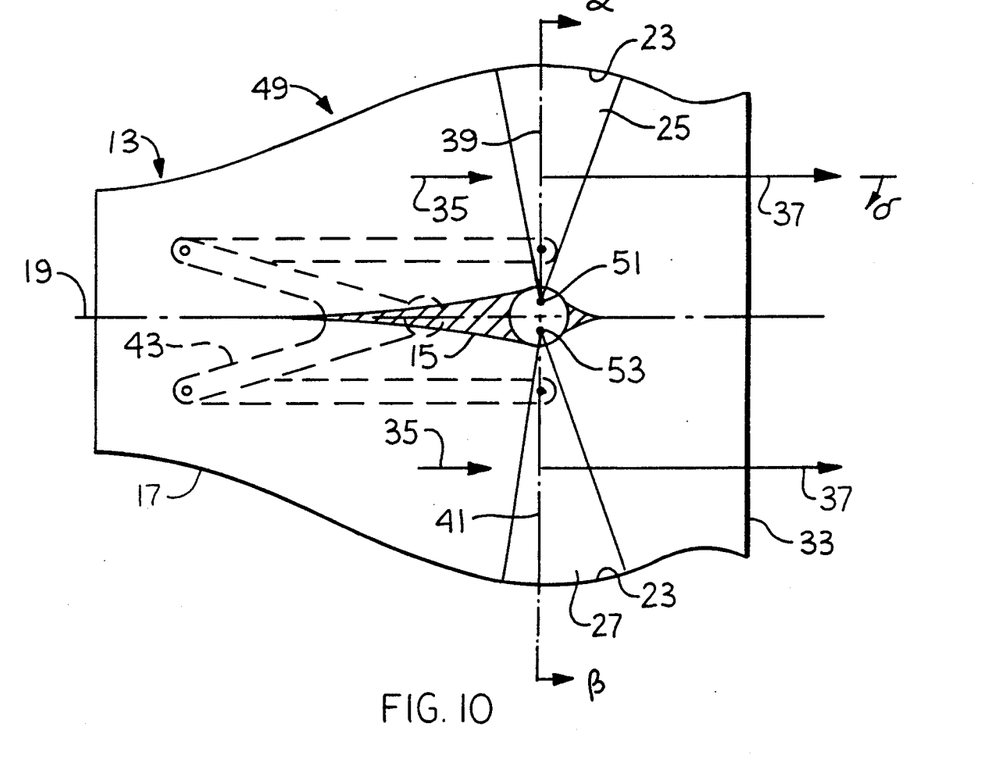
FIG. 10 is a plan view of an alternative embodiment of the invention in which the arms rotate about two parallel axes of revolution.

In apparatus 11, arms 25 and 27 rotate about a common axis of rotation, that is, axis 29. FIG. 10 illustrates apparatus 49, an alternative embodiment of the invention in which arms 25 and 27 respectively rotate about separate and spaced apart axes of rotation 51 and 53. Axes 51 and 53 lie in parallel. A plane including axes of rotation 51 and 53 lies normal to centerline 19.

Changes and modifications in the specifically described embodiment can be carried out without departing from the scope of the invention, which is intended to be limited only by the scope of the appended claims.

What is claimed is:

1. A nozzle apparatus for vectoring thrust and changing nozzle throat area comprising:
    a duct having an inner surface;
    two arms;
    each of said arms having a first and a second surface;
    each of said first surfaces cooperating with said inner surface to form a respective throat;
    said inner surface including an abutment section;
    said abutment section including an abutment surface comprised of at least one surface of revolution, with said second surface of each arm slideably abutting said abutment section along said abutment surface;
    said two arms being rotatable about at least one pivot axis; and
    said at least one pivot axis intersecting said abutment section.

2. The nozzle apparatus recited in claim 1 wherein said at least one pivot axis consists of two coplanar pivot axes.

3. The nozzle apparatus recited in claim 1 wherein said at least one pivot axis consists of one pivot axis.

4. A nozzle apparatus for vectoring thrust and changing nozzle throat area comprising:
    a flow duct having an inner surface;
    two arms rotatable about at least one pivot axis;
    each of said arms having a first surface;
    each of said first surfaces having a longitudinal crest cooperating with said inner surface to define a nozzle throat section;
    each of said crest defining a respective straight line; and
    each of said at least one pivot axis intersecting at least one of said lines.

5. The nozzle apparatus recited in claim 4 wherein said at least one pivot axis consists of two coplanar pivot axes.

6. The nozzle apparatus recited in claim 4 wherein said at least one pivot axis consists of one pivot axis.

7. A nozzle apparatus for vectoring thrust and changing nozzle throat area comprising:
    a flow duct having an inner surface;
    two arms rotatable about at least one pivot axis;
    each of said arms having a first surface;
    each of said first surfaces having a longitudinal crest cooperating with said inner surface to define a respective rotatable nozzle throat section and corresponding throat plane; and
    each of said throat planes respectively containing one of said at least one pivot axis throughout rotation of said arms.

8. The nozzle apparatus defined by claim 7 wherein:
    each of said arms has a distal end spaced apart from and rotating about one of said at least one pivot axis; and
    said distal end for each of said arms slideably abuts said inner surface of said duct.

9. The nozzle apparatus recited in claim 7 wherein said at least one pivot axis consists of two coplanar pivot axes.

10. The nozzle apparatus recited in claim 7 wherein said at least one pivot axis consists of one pivot axis.

11. A nozzle apparatus for vectoring thrust and changing nozzle throat area consisting of:
    a duct having an inner surface;
    two arms, each having a first surface and a second surface;
    a respective throat formed between each of said first surfaces and said inner surface;
    said second surfaces slideably abutting said inner surface;
    each of said arms being rotatable about a pivot axis at a first end portion thereof; and
    a second opposite end portion of each arm slideably abutting said inner surface.

12. A nozzle apparatus for vectoring thrust and changing nozzle throat area consisting of:
    a duct having an inner surface;
    two arms, each having a first surface and a second surface;
    a throat formed by cooperation between said first surfaces and an opposing portion of said inner surface;
    said second surfaces slideably abutting said inner surface;
    said two arms being rotatable; and
    a distal end of each arm slideably abutting said inner surface.

13. A nozzle apparatus for vectoring thrust and changing nozzle throat area comprising:
    a duct having an inner surface;
    two arms rotatable about at least one pivot axis;
    each arm having a surface cooperating with said inner surface of the duct to form a throat;
    a flow bifurcation structure positioned in said duct, extending between opposing sides of said inner surface, and being static relative to said duct; and
    said at least one pivot axis intersecting said flow bifurcation structure.

14. The nozzle apparatus recited in claim 13 wherein said at least one pivot axis consists of two coplanar pivot axes.

15. The nozzle apparatus recited in claim 13 wherein said at least one pivot axis consists of one pivot axis.

16. A nozzle apparatus for vectoring thrust and changing throat area comprising:
    a duct;
    means for creating a throat in said duct;
    said throat having a throat area;
    said creating means including means rotatable about at least one pivot connected to said duct;
    said at least one pivot defining at least one pivot axis;
    said creating means also being capable of creating at least one sonic choke plane;
    rotation of said rotatable means about said at least one pivot being capable of changing said throat area and rotating said at least one sonic choke plane; and
    each of said at least one sonic choke plane containing one of said at least one pivot axis throughout rotation of said rotatable means.

17. The nozzle apparatus defined in claim 16 wherein:
    said at least one pivot is one pivot; and said at least one sonic choke plane is two sonic choke planes rotatable with respect to each other.

18. The nozzle apparatus defined in claim 16 wherein:
said at least one pivot is two pivots and said at least one pivot axis is two pivot axes; and
said two pivot axes are coplanar.

19. A nozzle apparatus for vectoring thrust and changing throat area comprising:
a duct having an inner surface;
a throat in said duct having a throat area;
said throat being formed by said inner surface and a changing means for changing said throat area, for creating two sonic choke planes in said duct, and for rotating said sonic choke planes relative to said duct; and
said sonic choke planes being rotatable about a single axis that is generally coplanar with them throughout their rotation.

* * * * *